United States Patent

Mulaskey et al.

[15] 3,673,079

[45] June 27, 1972

[54] CATALYST MANUFACTURE
[72] Inventors: Bernard F. Mulaskey, Pinole; Elmore F. Chilton, El Cerrito, both of Calif.
[73] Assignee: Chevron Research Company, San Francisco, Calif.
[22] Filed: Jan. 21, 1970
[21] Appl. No.: 4,735

Related U.S. Application Data

[63] Continuation-in-part of Ser. No. 632,559, April 21, 1967, abandoned.

[52] U.S. Cl.............................208/111, 208/110, 208/112, 252/410, 252/437, 252/452, 252/453, 252/455 R, 252/461, 252/463, 252/464, 252/465, 252/466 PT, 252/466 J, 252/467, 252/471, 252/476, 252/477
[51] Int. Cl.........................................................C10g 13/02
[58] Field of Search...................208/111, 110, 112; 252/477, 252/452, 453, 463, 464, 465, 466, 437, 410

[56] References Cited

UNITED STATES PATENTS

| | | | |
|---|---|---|---|
| 2,944,005 | 7/1960 | Scott | 208/109 |
| 2,944,006 | 7/1960 | Scott | 208/109 |
| 2,481,493 | 9/1949 | Blue | 252/452 |
| 3,321,534 | 5/1967 | Landgraf et al. | 252/452 X |

FOREIGN PATENTS OR APPLICATIONS

| | | | |
|---|---|---|---|
| 988,702 | 4/1965 | Great Britain | 252/452 |

*Primary Examiner*—Patrick P. Garvin
*Attorney*—A. L. Snow, Frank E. Johnston, George F. Magdeburger, Charles J. Tonkin and T. G. De Jonghe

[57] ABSTRACT

Multicomponent catalysts are produced, for example, in the form of rod-like particles, by forming a slurry of gelatinous precipitates of compounds of elements for forming the desired catalyst components, in a strongly ionic aqueous medium, separating the gelatinous precipitates from the slurry without washing, partially drying the unwashed gelatinous precipitates in the form of subdivided cohesive particles to a controlled moisture content, recombining the partially dried cohesive particles and extruding to form extrudate rods, washing the extrudate rods until essentially free of contaminating ions present in the occluded ionic aqueous medium, and thereafter drying and calcining the washed extrudate rods. Catalysts with a variety of different compositions can be prepared by this same general procedure and can be used in appropriate different hydrocarbon conversion processes.

15 Claims, No Drawings

CATALYST MANUFACTURE

CROSS REFERENCES

This application is a continuation-in-part of Ser. No. 632,559, Catalyst Manufacture, filed Apr. 21, 1967, now abandoned.

BACKGROUND OF THE INVENTION

This invention relates to catalysts and to the use of solid catalysts for promoting hydrocarbon conversion reactions and, more particularly, it relates to new and improved procedures for manufacturing such catalysts. Still more particularly, the invention relates to new and improved methods of manufacturing multicomponent catalysts in the form of shaped particles suitable for use in packed beds to promote hydrocarbon hydroconversion reactions.

Solid catalysts have been widely used in the petroleum refining and associated arts to accelerate selectively desired chemical transformations of pure compounds and complex mixtures of compounds. The solid catalysts have been provided in a variety of shapes and sizes depending on the manner in which the reactions to be promoted are to be carried out, the catalyst forms including powders, microspheroids, irregular granules, and shaped particles in the form of pellets or extrudates. Catalysts in the form of powders and microspheroids are used, for example, in processes wherein the catalyst is maintained in a state of motion with respect to the fluid reactants undergoing treatment, such as in fluid catalytic cracking of vaporized hydrocarbons and in slurry or ebullated bed contacting of liquid hydrocarbons. In such processes, there is back mixing of reactants and products with the catalyst, but a uniform temperature may be more readily maintained in the reaction zone. In other hydrocarbon conversion processes it is found more advantageous to pass the reactants through a bed of catalyst particles, to minimize back mixing of reactants and products and obtain the benefits of longer contact time, in which case special provisions for temperature control in the reactor may have to be provided. To minimize pressure drop through the packed bed of catalyst particles, the particles are provided in the form of macroparticles of controlled dimensions achieved, for example, by pelleting or extrusion or agglomeration in the course of the catalyst manufacture. Extrusion is a considerably less expensive shaping technique than pelleting, but substantial problems are often encountered in achieving high strength density, and durability in extrudate catalysts without resort to techniques which adversely affect the catalytic properties. Agglomeration is not frequently used as a catalyst-shaping technique at present.

In the past, when shaped catalyst particles were prepared by extrusion or pelleting, the extrusion or similar shaping step was applied as one of the final operations in the manufacturing procedure. For example, material providing an inorganic oxide carrier or support for the catalyst, such as alumina, silica, or silica-alumina cogel, was brought to a state of high purity ready for final drying and calcining, then extruded and cut into short extrudate segments, and these were then calcined to form hard porous inorganic oxide carrier particles. Where it was desired to prepare a multicomponent catalyst, such as by incorporating a metal hydrogenation-dehydrogenation promoter in the catalyst, this was usually done by impregnating the formed carrier particles with a solution containing the added promoter. It has also been suggested to wet a purified, dried but uncalcined, synthetic silica-alumina carrier with a solution of a promoting metal compound, knead the mixture to extrudable consistency, adding water if necessary, and then to extrude the mixture to form multicomponent catalyst particles to be calcined. Only a limited number of special catalyst compositions can be prepared in this way.

As mentioned, solid catalysts in the form of rod-like or other shaped particles can be used in a variety of conversion processes, and the catalyst components and compositions used differ substantially according to the particular type of process and reactions desired to be selectively promoted. Multicomponent catalysts, i.e., those containing at least three essential components, are particularly of interest. Catalysts designed for use in packed beds in reactors desirably have long life so that it is only necessary to unload and replace the catalyst with a fresh charge at infrequent intervals. As a result, if a commercial catalyst manufacturing process is only useful in preparing one or two special catalyst compositions, the manufacturing facilities will be idle a large part of the time unless operated at inefficient low rates to gradually accumulate large inventories of product. Accordingly, it would be highly advantageous if a versatile process could be provided which would be useful in manufacturing a large variety of catalysts having different compositions in the form of shaped, e.g., rod-like, particles suitable for use in packed beds through which reactant fluid is to be passed at appropriate reaction conditions of time, temperature, and pressure to promote selectively the desired conversions. The manufacturing facilities could then be kept operating at high capacity continuously, producing different catalysts at different times, provided the same process could be used to make different catalysts which were all of high quality so that they would all be in demand. The present invention provides such a process.

SUMMARY OF THE INVENTION

In accordance with the process of the present invention, a mass of gelatinous precipitates is dried to a controlled water content, then shaped to form salty macroparticles which can be washed free of salts without losing their shape, and then the salty macroparticles are washed to remove salts.

Shaping methods for forming macroparticles include extrusion and agglomeration. Pelleting is believed to be an unsatisfactory method for the shaping step of the present invention. Spraying or "spray drying" as presently practiced according to currently available literature, has been found by us to be unsatisfactory as a shaping method in the catalyst manufacturing procedure of the present invention.

In addition, spray drying, as currently practiced according to currently available literature, produces microparticles as opposed to macroparticles, as in the process of the present invention. The term "macroparticles" is used herein to mean particles larger than microparticles, particularly the microparticles typically produced by "spray drying." U.S. Pat. No. 2,768,145 describes a spray drying process for producing microspheres, which usually are primarily within the range of 20 to 80 microns in diameter. U.S. Pat. No. 3,124,540 also describes a spray drying technique for producing catalyst particles. Over 85 percent of the particles obtained by the spray drying technique in U.S. Pat. No. 3,124,540 were of size 40 mesh (about one sixty-fourth inch diameter) or smaller. In contrast, macroparticles are usually considerably larger than 40 mesh, as, for example, one thirty-seconds or one-sixteenth inch diameter and larger.

As disclosed in U.S. Pat. Nos. 2,768,145 and 3,124,540, microspheres obtained by spray drying may be washed subsequent to the spray drying step. However, the unwashed particles produced by spray drying, as apparently currently practiced, in addition to having a considerably smaller size than the macroparticles produced in accordance with the method of the present invention, also have a lower moisture level than particles produced in accordance with the method of the present invention. Microspheres produced by prior art spray drying techniques essentially always contain less than about 50 volume percent water. As will be seen from the description herein below, the unwashed particles produced in accordance with the method of the present invention preferably contain more than 50 volume percent water. Use of prior art "spray drying" techniques in an effort to obtain particles having relatively high moisture content was found by us to be unsuccessful. Thus, "spray drying," as currently practiced according to currently available literature, is not a suitable catalyst shaping method for employment in the process of the present invention.

Particles particularly catalyst particles, have been shaped in the past by dropping small droplets of, e.g., hydrosol into a body of oil (bead forming process). This particle forming method is not within the scope of the present invention; it is to be noted that in the present invention the particles are shaped after the mass of gelatinous precipitate has been dried to a controlled water content, whereas in the bead forming process no drying of a gelatinous precipitate is carried out prior to forming the particle shape.

As indicated above, agglomeration is a suitable method for forming macroparticles in the process of the present invention. The term, "agglomeration," is used herein to connote a clustering together or accumulation of particles or substances, and has particular reference to forming of macroparticles by stirring or otherwise agitating a gelatinous precipitate, generally with simultaneous drying. Furthermore, the term agglomeration as used herein relates to the forming of salty gelatinous precipitate macroparticles which macroparticles contain a substantial amount of volatiles or moisture, usually in excess of 50 weight percent volatiles, but yet the macroparticles are sufficiently strong to retain their basic shape while being washed to remove salts or contaminating ions.

We have had success in shaping hydrogel macroparticles by agglomeration by placing wet, unwashed gelatinous filter cake in a granulator (stirred pan) and stirring the gelatinous precipitate while simultaneously passing warm air over the gelatinous precipitate. Balls about one thirty-seconds to one-sixteenth inch in diameter were formed, having a volatiles content of about 68 weight percent. The balls were successfully washed, i.e., they did not fall apart, but instead substantially retained their shape and most of the contaminant ions were removed from the balls by washing.

In accordance with a particularly preferred embodiment of the present invention for producing catalyst in the form of shaped solid particles, a mass of salty gelatinous precipitates, dried to a controlled water content, is extruded to form salty extrudate shapes which can be washed free of salts without losing their shape, whereby the washed extrudate shapes, when subsequently dried and calcined, can shrink to form the desired catalyst particles.

The term, "salty," is used herein with its broadest meaning to include not only NaCl and ions of Na and Cl, but also any other cations and anions which will combine to form salts. The term has particular reference herein, however, to anions, cations and salts which deleteriously affect catalyst properties and thus represent contaminants or impurities if present in the finished catalyst. The term is used herein to include a "salt" such as HCl left in silicagel formed by adding HCl to silica sol.

It has now been found that when extrusion is applied to a moldable plastic mass of mixed hydrous oxides containing strongly ionic occluded aqueous slat solutionm the mass appears to change to a solid hydrogel which is washable, if the water content of the mass was appropriately adjusted into a narrow range by careful drying prior to the forming, particularly forming by extrusion. Whether a true hydrogel is formed is not readily demonstrated, but it is readily apparent that the extrusion produces washable shapes which retain their shape during washing, whereas the mass prior to extrusion would usually revert to a formless jelly or dispersion of solids if washing were attempted.

In fact, according to methods heretofore proposed where multicomponent catalysts were to be manufactured by simultaneous coprecipitation of hydrous metal oxides of the elements forming the essential catalyst components as a slurry of gelatinous precipitates in aqueous media, the precipitated mass had to be washed prior to drying, because after drying the contaminating salts would not wash out completely. The washing required that the precipitates be repeatedly filtered, reslurried for washing, refiltered, reslurried, etc., to obtain the mixed hydrous oxides in a purified state free of occluded salt anions and cations. Extrusion of the purified hydrous oxides after drying was sometimes successful, but so frequently failed to produce strong extrudate particles of desired density that pelleting was resorted to. This made the proposed methods more expensive than conventional impregnation methods.

Salty extrudate rods formed in accordance with the present invention can be washed free of all contaminants in a continuous countercurrent wash liquid flow system without having to resort to any intermittent reslurrying or filtration or similar procedure to separate washed solids from wash liquid, other than simply draining excess wash liquid from the shaped extrudate rods, since the extrudate retains its coherent nature and rod-like shape (though some breakage to shorter rods will occur in handling if the rods are initially too long).

Thus, in accordance with a specific method of manufacturing multicomponent catalysts according to the present invention, there is first formed a slurry of gelatinous precipitates in a strongly ionic aqueous medium, preferably at a pH of 6–8 to minimize solubility of the expensive elements in the aqueous medium, though the pH may range from 3.5–9 without adverse effect of the finished catalyst's properties. The said gelatinous precipitates usually comprise finely divided hydrous oxides of at least two, and according to particularly preferred embodiments of the present invention, at least three elements selected from magnesium, aluminum, silicon, tin, titanium, zirconium, copper, silver, gold, vanadium, molybdenum, tungsten, chromium, manganese, rhenium, ion, cobalt, nickel, platinum, palladium, phosphorus, arsenic, and antimony, including at least one hydrous oxide convertible to a porous oxide carrier of high surface area by calcining. A mass of unwashed gelatinous precipitates comprising the above described hydrous oxides, and containing occluded ionic aqueous medium, is separated from the said slurry, e.g. by filtration. The mass of unwashed gelatinous precipitates is subdivided into cohesive particles which comprise more than 85 weight percent water, e.g. by breaking up the filter cake. The subdivided particles of unwashed gelatinous precipitates are partially dried in an atmosphere of high relative humidity until the cohesive particles thereof comprise 55–83 weight percent water. The partially dried cohesive particles, still containing occluded ionic aqueous medium are recombined, and the recombined mass of partially dried unwashed gelatinous precipitates is extruded, forming extrudate rods of larger diameter than desired for the final catalyst particles. The extrudate rods are then washed until essentially free of catalyst-contaminating ions present in the occluded ionic aqueous medium, and the washed extrudate rods are then dried and calcined, thereby forming directly the desired catalyst particles by shrinkage of the extrudate rods.

An important factor in achieving best results in the practice of the invention is the use of procedures which bring the mass of salty gelatinous precipitates to an appropriate narrow range of water content for extrusion, with a minimum of underdrying and everdrying of portions of the precipitated mass. Overdrying is particularly to be avoided as the inclusion of overdried material makes the final product weaker. Partial drying of filter cake fragments and reworking into shaped cohesive pieces for further partial drying prior to final extrusion is one suitable method for avoiding overdrying and underdrying of separate portions. The use of slow drying in atmospheres of controlled humidity at low temperatures is helpful in avoiding overdrying portions of the cohesive pieces. Overdried particles can be separated out, if formed, on the basis of density, i.e., using a sink-float separation in a liquid of appropriate specific gravity.

The optimum water content for final extrusion of the salt-containing material differs depending on the composition of the catalyst being manufactured, but is generally in the range 65 to about 85 or 85 weight percent, in the upper end of this range for predominantly silica carriers and in the lower end of this range for predominantly alumina carriers. About 69–75 percent water has been found acceptable for nearly all combinations of components tried. Salty extrudate rods can be formed from some unwashed precipitates containing above 80 percent water, but these require much more careful handling to avoid squashing, crumbling, or other deteriorating loss of shape during washing in commercial scale equipment. The extrudate becomes firmer if allowed to stand for several hours before washing, possibly due to slow cross-linking of hydrogel bonds. Salty extrudate rods can also be formed from some unwashed precipitates containing below 65 percent water, but these require much more extensive washing to remove the occluded salts, more breakage occurs in the washing, and the extrusion is more difficult, problems of excess surface drying by frictional overheating sometimes arising unless the carrier has a high alumina content. In this respect, the use of a ram-type extruder is preferred to shape the unwashed precipitate having a water content in the preferred range, as materials with these moisture contents are often too soft to be satisfactorily shaped in a continous screw-type extruder.

During the normal course of handling associated with the washing and drying steps, the extrudate rods if properly formed according to the instructions herein tend inherently to break into rod segments which shrink to rod-like particles having a desirable range of length to diameter ratios (L/D of 1–3) for catalyst particles to be used in a packed bed for contacting hydrocarbon fluids without excessive pressure drop. Consequently, it is not necessary to cut the extrudate rods to length, but this may be done if a high degree of size uniformity is considered important in the product.

Extrudate "rods," as the term is used herein, is intended to include any shape obtainable by extrusion (i.e., by forcing moldable material through a constricting passageway), and thus includes not only solid cylindrical bars but also hollow tubes and other shapes obtainable by using special die openings, e.g., providing star-shaped, rectangular, or half-moon cross sections. For reasons which will become apparent from the detailed discussion hereinafter, however, there are advantages to providing the extrudate in the usual form, viz., as cylinders.

When prepared according to the preferred techniques hereinafter described, the finished calcined catalyst particles are hard, glassy, transparent, gel-like material exhibiting the conchoidal fracture when broken characteristic of true hydrogels. Examination of the finished catalyst under a microscope shows it to be essentially a solid chunk of xerogel. No structure can be seen at high magnifications. A microtome wafer segment of the catalyst particle is clear and transparent, though usually colored. The catalyst particles can be prepared to have the high particle density (1.4–1.7 g/cc), hardness (above 30 pounds crushing strength), and attrition resistance (less than 6 percent loss to fines when tumbled one-half hour in a rotating drum) heretofore only obtainable in silica-alumina microspheroids produced by the bead process. However, low density catalyst particles can also be prepared. Additionally, the catalyst particles of the present invention can be prepared with high density and hardness coupled with high surface area (above 300 m²/g), low pore volume (0.25–0.4 cc/g), and with a narrow pore size distribution, e.g., predominantly micropores with diameters in the range below 1,000 Angstrom units with less than 10 percent of the pore volume being attributable to macropores having diameters above 1,000 Angstrom units. These properties are further reflected in the catalysts having higher activity and greater stability (maintaining high activity for a longer time of use) as compared to catalysts of similar composition prepared by conventional impregnation methods.

As indicated previously, the catalyst manfacturing procedure of the present invention is particularly advantageously used to produce a multifunctional catalyst containing at least three components. At least one component is regarded as a porous inorganic oxide carrier of high surface area and is formed from a hydrous oxide of an element of Group IIA (specifically magnesium), IIIA (specifically aluminum), IVA (specifically silicon), or IVB (specifically titanium or zirconium). In addition, at least one component is regarded as a specific reaction catalyzer formed from a metal element of Group IB (copper, silver or gold), VB (vanadium), VIB (molybdenum, tungsten or chromium), VIIB (manganese or rhenium), or VIII (iron, nickel, cobalt, platinum or palladium). The above-mentioned specific reaction catalyzers are often referred to as "metals" in contrast to the inorganic oxide carrier. The present invention is particularly concerned with catalysts, their preparation and use, wherein the above-mentioned specific catalyzer component is a hydrogenation-dehydrogenation promoter formed from a compound of an element of Group VIII, especially nickel. The third component of the catalyst, according to this particularly preferred embodiment of the present invention, is either another porous inorganic oxide carrier, or carrier, promoter or modifier, or the third component may be another specific reaction catalyzer, promoter or modifier, formed in either case from a different element selected from the above-named groups, to which may be added Group VA (phosphorus, antimony, or arsenic). In many cases four or more elements are present.

A particularly notable feature about the present invention is that multifunctional catalysts can be prepared within extremely broad ranges of relative proportions of the components and without limitation on the number of components, all in the form of shaped solid particles suitable for use in fixed bed contacting or reactants. The catalyst preparation process of the present invention is particularly advantageously applied to production of catalysts containing a high percent of "metals" associated with the inorganic oxide carrier, for example, in excess of 10 weight percent metals and as high as 15 to 30 weight percent metals or higher. In contrast, according to usual catalyst manufacturing methods wherein a metal promoter is deposited on a preformed carrier or support as by impregnation, the amount of promoter which can be incorporated is limited by the water solubility of the impregnating salt and the pore volume of the carrier.

In the calcined catalyst particle of the present invention all of the catalyst components are considered to be present as oxides, though there is undoubtedly some strongly bound water and/or linking hydroxyl groups. The oxide may not be the most active form for a hydrogenation-dehydrogenation promoter or other specific catalyzer, and consequently this metal oxide may desirably be converted to a more active form desired for the reactions to be promoted, either as an added finishing step in the catalyst manufacture or as part of the process start-up, or the metal oxide may convert to the more active form during use. For example, in using a catalyst composed of nickel oxide, silica, and alumina prepared according to the present invention for hydroconversion (e.g., hydrocracking or hydrotreating) of oils, it is desirable first to convert the nickel oxide at least partly to nickel sulfide.

To further clarify the above, the following are examples of multifunctional catalysts which can be prepared in accordance with the new procedures described herein:

1. A nitrogen sensitive hydroconversion catalyst comprising cobalt and/or nickel oxide, silica, and/or alumina, used in the sulfided state for converting a hydrocarbonaceous feed of low contaminant content (less than 200 ppm nitrogen) to lower boiling hydrocarbons by contacting the hydrocarbonaceous feed in the presence of excess hydrogen at temperatures of 550°–800° F. and pressures above 500 psig;

2. A nitrogen insensitive hydrocracking catalyst comprising nickel and/or cobalt oxide, tungsten or molybdenum oxide, silica and/or alumina, used in the sulfided state for converting a hydrocarbonaceous feed of high contaminant content (greater than 200 ppm nitrogen) to lower boiling or more valuable hydrocarbons by contacting the hydrocarbonaceous feed in the presence of excess hydrogen at temperatures of 700°–850° F. and pressures above 500 psig;

3. a sulfactive hydrofining-hydrocracking catalyst comprising cobalt or nickel oxide, tungsten or molybdenum oxide, alumina, and/or silica, used in the sulfided state for converting a hydrocarbonaceous feed of high contaminant content to lower boiling or more valuable, less contaminated hydrocarbons, by contacting the hydrocarbonaceous feed in the presence of excess hydrogen at temperatures of 600°–850° F. and pressures above 500 psig;

4. A sulfactive hydrogenation catalyst comprising nickel oxide, molybdenum oxide, and alumina, used in the sulfided state for purifying a contaminated hydrocarbonaceous feed, with minimal hydrocracking to lower boiling or more valuable hydrocarbons by contacting the hydrocarbonaceous feed in the presence of excess hydrogen at temperatures of 600°–800° F. and pressures above 200 psig.

Each of the above catalysts may be used similarly when in the preparation thereof there is also incorporated titania, zirconia, or oxides of any of the other metals previously named.

In prior art methods of preparing catalysts of the above description, it was readily apparent which components made up the refractory inorganic oxide carrier and which components were the hydrogenation-dehydrogenation promotors or modifiers, because generally the inorganic oxide carrier such as alumina or silica-alumina was prepared first and then impregnated with solutions containing compounds of the promoting metals such as nickel and molybdenum. When, in accordance with the present invention the finished catalyst particle has the appearance of a xerogel or all-embracing cogel, and the elements making up the essential catalyst components were all precipitated together as hydrous oxides and then worked up into the finished particle, it is not so readily apparent which components make up the carrier and which make up the promoters. In prior art catalysts, the component which was distributed or supported on the carrier could be distinguished from the carrier by its tendency to form crystallites which became larger during the course of using the catalyst. The catalysts prepared according to the preferred new procedures described herein exhibit very little tendency towards growth of metal crystallites, and any that do form are much smaller and more dispersed than characteristic of most prior art catalysts. Accordingly, while the terms "carrier" and "catalyzer" are used herein with reference to the different catalyst components, it will be recognized that this terminology is used purely as a matter of convenience rather than intending to be limiting as to the true nature of the catalyst. The catalyst must contain, however, at least one oxide recognized as capable of forming by itself a porous oxide carrier. Those skilled in the art will recognize from the previously accepted usages of these terms which classes of elements and compounds are being referred to.

DESCRIPTION OF PREFERRED EMBODIMENTS OF THE INVENTION

As previously described, in manufacturing catalysts according to the present invention there is formed a slurry of gelatinous precipitates in a strongly ionic aqueous medium. To accomplish this selected elements desired in the catalyst are advantageously first made up into aqueous solutions or sols of compounds of the selected elements. For example, where nickel is desired in the catalyst, a soluble nickel salt may be dissolved in water, or nickel metal may be reacted with acid and diluted with water, forming a similar solution. A solution of an aluminum compound may be similarly formed, or the nickel and aluminum may be dissolved as compounds in a single solution; likewise compounds of zirconium and/or titanium. These and similar metal elements all form acidic salts which are soluble in acidic solutions. Suitable salts include the chlorides, nitrates, acetates, carbonates, sulfates, phosphates, and the like. Advantageously, to simplify the chemistry, a common anion is used to make up the soluble salts, and the most convenient and desirable of these for purposes of the present invention is chloride.

If silicon is desired in the catalyst, this can be brought into solution as ethyl silicate, a silica sol, sodium or other alkali metal silicate, or any other soluble compound. If molybdenum or tungsten are desired in the catalyst, these can be dissolved as molybdic acid or tungstic acid (with difficulty) but more readily as any of the ammonium molybdates or ammonium tungstates, but alkali metal compounds such as sodium molybdate and sodium tungstate can also be employed in aqueous solutions. One good way to make a tungsten solution is to dissolve ammonium paratungstate powder in aqueous caustic solution.

The above solutions needed to prepare the desired catalyst are to be combined and treated to form a slurry of gelatinous precipitate, or mixed gelatinous precipitates, in which slurry it will be observed, there will be present all the anions such as chloride and all the cations such as sodium used in making up the solutions. Bearing in mind that these particular ions, sodium and chloride, have previously been found to be particularly deleterious contaminants in catalysts of the type used for promoting hydrocarbon hydroconversion reactions, which catalysts represent a class of principal interest for preparation in accordance with this invention; and considering further that, as previously described, these cations and anions are to a substantial extent to be carried through the catalyst preparation in contact with the gelatinous precipitates until after the final extrudate rods have been formed; nevertheless, it has been found preferably to employ precisely these salt-forming cations and anions in the present invention.

In the preferred method of forming the gelatinous precipitate the previously prepared acidic aqueous solutions are combined to form a single aqueous solution or sol at an acidic pH. Having made up the acid solution or sol containing compounds of the desired elements, this is titrated to approximately neutrality by adding slowly, with mixing, a suitable base such as an aqueous solution of caustic or, more desirably, ammonia. Essentially all of the metals and silica will precipitate, i.e., form finely divided insoluble hydrous oxides or dispersed hydrogels, forming the desired slurry of gelatinous precipitates in a strongly ionic aqueous medium.

As mentioned, the gelatinous precipitates are believed to comprise finely divided hydrous oxides of the elements forming the catalyst components, which terminology is intended to include dispersed hydrogels, hydrated oxides, hydroxides, and the like. In fact, it may be considered purely speculative, academic, and immaterial what the nature of the precipitated compounds is, since by following the subsequently described steps of the invented procedure the desired oxide catalyst will be produced.

The mass of gelatinous precipitates in the above-described slurry is separated therefrom, for example by filtration on a rotary drum vacuum filter, in which case there is formed a filter cake of unwashed gelatinous precipitates which contains occluded strongly ionic aqueous medium containing salt-forming anions and cations derived from the solutions which were combined in forming the said slurry. The occluded aqueous medium is described as strongly ionic, and in the following processing steps it becomes even more strongly ionic as part of the water therein is evaporated. The slurry of gelatinous precipitates was sufficiently dilute so that any compounds therein which tend to form true gels could not set to form a gel, which was further prevented by mixing. Generally, the total concentration of silica and metal elements in the slurry, expressed as dry oxides, may be only 2–3 weight percent, but the voluminous gelatinous precipitate with loosely bound water and occluded aqueous medium may actually occupy from 30–50 percent or more of the slurry volume. Thus, a typical filter cake may comprise 90–95 weight percent water, and the molar concentration of salt-forming ions therein may nearly equal the molar concentration of dry oxides.

The mass of unwashed gelatinous precipitates is next subdivided into cohesive particles which usually will contain more than 83 weight percent water due to the occluded ionic aqueous medium therein, usually 85–90 percent water or more. In one method, this subdividing can be accomplished on the rotary vacuum drum filter, if one is used, by directing a reverse air blast outwards through the filter cake just prior to discharge from the rotating drum.

The cohesive pieces of filter cake are easily deformed and break up if washing is attempted. They may be dried to the desired water content by flowing humid air through a loose mass of the subdivided cohesive particles at a low temperature, desirably below about 150° F., but above about 90° F. The cohesive pieces of filter cake containing more than 85 percent water as occluded ionic aqueous medium are to be dried to a water content in the range of 55–83 weight percent, controlled to a narrower range of water content within this broad range appropriate for the particular catalyst being manufactured, the said narrower range usually being in the range 65–80 weight percent, as mentioned previously. The subdivided cohesive particles if in the form of filter cake fragments or chips should be of a size and thickness, and sufficiently uniform, to permit free flow of drying medium through a loosely packed shallow bed thereof for slow, uniform drying. For example, chips about one-sixteenth to three-sixteenth inch thick and ½–1 inch square are suitable and easily formed. The rate at which a particle of material of this type will dry is proportional to the surface area:volume ratio of the particle. Thus, for example, a one-eighth inch diameter sphere will dry several times more rapidly than a one-fourth inch sphere. If the filter cake chips or particles are not uniform in size, small particles may break off of large ones, and the smaller particles will tend to be dried sooner and to a lower water content than the larger particles, which can lead to the production of weak catalyst product if the overdried material is incorporated in the final extrudate. Accordingly, it is advantageous in some cases to provide means for cutting or otherwise shaping the filter cake into uniformly sized and shaped particles for drying rather than relying on the inherent nature of the filter cake to form such uniform shapes. Also, to aid achieving uniform drying of the mass of gelatinous precipitates, the pieces can be reformed after an initial partial drying step to form more uniformly shaped subdivided particles which are then subjected to a further stage of partial drying to the desired final water content for final extrusion. This reforming can be by extrusion to form soft extrudate rods. This is a particularly good way to make shapes which will dry uniformly, because the extrudate rods, having uniform diameter, will have approximately the same surface area:volume ratio, regardless of differences in the lengths of the rods, provided the lengths are substantially greater than the diameter. That is, the end surface area of a long extrudate rod is only a small portion of the total surface area.

When the partially dried subdivided cohesive particles have been brought into the desired range of moisture content, they are recombined and worked together, and extruded to form the extrudate rods which can then be washed free of the contaminating salt ions therein. For example, the mass of partially dried cohesive particles is loaded into the cylinder of a ram-type extruder, and the ram piston then first compresses the subdivided particles into a plastic mass and then forces the material through a die. The size of the shaping opening in the die plate is such as to provide rod-like extrudate having a diameter larger than desired in the finished catalyst product to allow for shrinkage during subsequent drying and calcining. For example, to produce finished catalyst pellets having a diameter of about one-eighth inch, the extrudate is formed in a rod having a diameter of about three-sixteenth inch.

If the material fed to the extruder has been uniformly dried to the proper moisture content, the extrusion of the salty material can produce an extrudate that is clear, smooth, waxy-looking, and free of interior and exterior defects.

The careful drying of the subdivided particles of gelatinous precipitate to the proper moisture content prior to this final extrusion step not only provides material of the proper consistency for extruding into solid extrudate rods which will not fall apart when subsequently washed, but is also important to prevent the occluded salts becoming irreversibly bound within the hydrogel-like material produced. Thus, if the material is overdried to too low a moisture content prior to extrusion, the material can still be extruded successfully to form solid rods, but it is then found that a portion of the sodium ion in particular is no longer removable by repeated washings. For example, when mixed hydrous oxides of nickel, silica, and alumina containing occluded water and sodium chloride (as ions) was dried to a water concentration of 70 weight percent, and then extruded, subsequent washing with 6 volumes of ammonium bicarbonate and then with one of water would reduce the sodium concentration in the final catalyst to 400 ppm. About 350 ppm Na remained when dried only to 80 percent water, extruded, and washed. When, however, the material was dried to 60 weight percent water content, extruded, and washed in the same way, the residual sodium concentration was 600 ppm. If dried to 30 percent water before extrusion, 1,600 ppm Na remains after washing the extrudate. Thus, the water content of the partially dried cohesive particles of salt-containing gelatinous precipitate of this type should not be reduced below 60 percent before extrusion, and preferably the water content is at least 69 percent. It is quite fortuitous that there exists a narrow range of water content wherein the extrudate rods formed are solid enough to retain their shape during washing, yet not so solid or dry that the sodium has become bound up therein.

The extrudate rods can be washed directly to remove the salt-forming anions and cations present therein. Desirably this is done in a countercurrent manner which may be stepwise in stages. Thus, for example, as the final washing stage there is used pure (demineralized) water passed or circulated through the extrudate rods in a container. The effluent wash water containing any ions which remained in the extrudate rods to be washed out is then passed to the next upstream stage of washing for use therein. Desirably the upstream wash medium is a dilute ammonium acetate or ammonium carbonate or bicarbonate solution to aid in the displacement of sodium and chloride ions from the extrudate rods. Any small amount of ammonium and acetate or carbonate ions remaining in the final washed extrudate present less of a problem, since these materials can volatize or decompose in the subsequent drying steps. The dilute ammonium acetate solution is passed forward and reused in additional upstream washing stages, becoming continually more concentrated in the anions and cations which have been washed out of the extrudate rods. The wash solution from the first stage of washing the salty extrudate rods is discarded or sent to recovery facilities. After the extrudate rods have been washed free of occluded ions they may be subjected to steaming with saturated steam at about atmospheric pressure as a means of adjusting the properties in such a way that the final particle density can be lowered by prolonged steaming. The less dense particles, however, are usually less strong than more dense ones, and consequently a balance must be struck in this respect. Whether or not steamed, the washed extrudate rods can then be dried and calcined.

The following examples illustrate the versatility of the new catalyst manufacturing method in producing a variety of different catalysts, and show the effect of changes in various of the significant features in the method, as influenced by the type of catalyst being prepared.

EXAMPLE 1: NICKEL-ALUMINA HYDROCONVERSION CATALYST

Aluminum oxide is reacted with hydrochloric acid in water to form a 20 percent aluminum chloride solution. In the same manner, nickel powder is reacted with HCl in water to form a 30 percent nickel chloride solution.

586 grams of the aluminum chloride solution is put into a large container. To this is added 248 g of the nickel chloride solution and 180 g of glacial acetic acid; a second solution is made by diluting 1,153 g of waterglass (sodium silicate) with 2 liters of water. This freshly prepared dilute solution is added slowly to the first solution with vigorous stirring to form a clear sol of the alumina, nickel and silica. To this clear sol solution is then added dilute aqua ammonia (16.5 wt % NH$_4$OH). The ammonia is added slowly with stirring until the gelatinous precipitate-solutions reach of pH of 7.5. The solution is then heated to 150° F. for 1 hour. The material is then filtered hot. The resulting filter cake is removed from the filter paper and spread on a drying tray to a uniform shape and thickness. The reformed filter cake is then scored into uniform one-half inch squares. The material is then put into a drying oven and slowly dried at about 250° F. The filter cake will slowly shrink and break on the score lines. The material takes on a characteristic translucent appearance at the correct moisture level of between 70 to 80 percent, preferably about 75 percent volatiles. One will find that the entire square of gelatinous precipitate has dried very uniformly. Each square is removed from the oven as the proper volatile level is reached. The material is now ready for shaping. It is extruded to the final catalyst shape, washed, dried and calcined. The finished catalyst contained 6 weight percent nickel and 12 weight percent alumina.

EXAMPLE 2: NICKEL-MOLYBDENUM-ALUMINA HYDROCONVERSION CATALYST

The same aluminum chloride and nickel chloride solutions are used in this preparation as in Example 1; 183 grams of molybdic acid are dissolved in 366 cc of concentrated HCL. This is heated and stirred to form a clear solution. 7 liters of distilled water is placed in a large container. To this is added 286 g of nickel chloride solution, 3450 g of aluminum chloride solution, and 250 g of glacial acetic acid. Then the molybdic acid solution is added. The mixture is then neutralized with dilute ammonia to a pH of 7 and is heated to 200° F. for 1 hour. The pH after heating is 6.0. This material is then filtered and dried in a manner similar to the first preparation. We find that the optimum volatile level for extrusion for this type catalyst is lower than the earlier preparation; volatiles content in the range 65–70 percent is preferred. The 65–70 percent volatile material is extruded in a ram-type extruder to form salty extrudate rods with a diameter of about five thirty-seconds inch. The extrudate rods are then washed essentially free of the occluded sodium and chloride ions using aqueous ammonium acetate solution in a countercurrent manner and finishing with a demineralized water wash. The washed rods are then dried with humid air, and then calcined. During the course of the washing and drying steps, the extrudate rods break and shrink to form rod-like particles having a diameter of about 0.1 inch and a length of about 0.2 inch.

To summarize the foregoing, it is seen that in accordance with the present invention a new and improved technique for manufacturing catalyst particles has been provided; a variety of different catalyst compositions can be produced; catalysts having new and highly desirable properties can be prepared; and important process advantages are achievable using the catalysts. The types of catalysts and catalyst compositions which can be produced, and the process usages to which they can advantageously be applied, are far more numerous than is indicated by illustrative embodiments described in detail herein.

After partial drying of the gelatinous precipitate of hydrous metal oxides, the precipitate is shaped into a macroparticle and washed to remove salts (contaminants). Various shaping methods can be used, but extrusion gives particularly good results. The extrudate particles have been found to have a surprisingly high strength. Also, it has been found salts can be washed surprisingly thoroughly from the extrudate particles without using great amounts of washing fluid. Although our invention is not to be interpreted as restricted by the following theory of operation, it is believed that one reason for the unexpected high degree of success in producing catalyst by extrusion of salty gelatinous precipitate followed by washing is that "cross knitting" of hydrous oxides occurs in the extrusion of the partially dried salty precipitate, thus forming a rigid macroparticle which, although containing a large amount of volatiles, can be readily washed to remove salt impurities without losing its shape.

The washable salty extrudate rods formed from partially dried gelatinous precipitates of hydrous metal oxides have been described herein as in the form of cylindrical rods, but they may be made up into extrudate of any desired shape and/or size including hollow cylinders which can be cut to short segments. Macroparticles made in accordance with the present invention preferably are about one thirty-seconds to five-eighths inch in diameter. Very large or thick macroparticles or extrudate shapes can be washed free of the contaminating ions, though this must be done more thoroughly, using more washing liquid, and unusually large shapes will tend to develop surface cracks in the final drying and calcining steps unless carried out slowly and with great care.

Additional steps may be added to the catalyst manufacturing procedure, additional components may be added to the finished catalyst, the extrudate, or earlier in the preparation, without departing from the spirit or scope of the present invention. For example, if fluoride is desired in the catalyst, this can be added as ammonium fluoride at any suitable point in the preparation, including incorporating fluoride in one of the original solutions or in the slurry of gelatinous precipitates. In this respect, it has been found that fluoride, unlike chloride, appears to react with many of the porous carrier-forming oxides so that a desired amount thereof is not removable in the washing steps after partial drying and extrusion. Molecular sieves or zeolites can also be added to the solution or the slurry of gelatinous precipitate. A particularly advantageous embodiment of the present process is to add the unwashed or incompletely washed or deionized molecular sieves at a point in catalyst preparation prior to extrusion and washing; then the sieves can be washed, e.g., with an ion exchange aqueous solution, at the same time the main body of the salty extrudate containing the sieve is washed. The method may also be used to prepare catalyst composed entirely of oxides forming a multicomponent porous oxide "carrier," such as silica-alumina-magnesia isomerization catalyst. Also, it is quite apparent that the methods disclosed herein are also applicable where a catalyst is to be used ultimately as granules, small particles, or powder, as the dried, washed extrudate can be broken up before or after calcining. Accordingly, the invention is not to be construed as limited to the specific embodiments illustrated, but only as defined in the appended claims.

I claim:

1. A process for manufacturing catalyst from a salty gelatinous precipitate which comprises:
   a. Partially drying the salty gelatinous precipitate to a moisture level between about 50 and 85 weight percent;
   b. Forming the salty gelatinous precipitate into a salty macroparticle capable of retaining its basic shape during washing;
   c. Washing salt from the salty macroparticle; and
   d. Drying and calcining the washed macroparticle.

2. A process in accordance with claim 1, wherein the forming is accomplished by agglomeration.

3. A process in accordance with claim 1, wherein the salty gelatinous precipitate is dried to a moisture level between 55 and 83 weight percent water before or during the forming step "b."

4. A process for manufacturing catalysts in the form of shaped solid particles which comprises partially drying a salty gelatinous precipitate to a moisture level between about 50 to 85 weight percent, extruding the partially dried salt-containing gelatinous precipitate to form a salt-containing extrudate shape which can be washed free of salt without losing its shape, washing salt from the salt-containing extrudate shape, and drying and calcining the washed extrudate shape.

5. A process according to claim 4, wherein said gelatinous precipitate comprises finely divided hydrous oxides of at least three elements selected from the group consisting of magnesium, aluminum, silicon, tin, titanium, zirconium, phosphorus, arsenic, antimony, iron, cobalt, nickel, platinum, palladium, manganese, rhenium, molybdenum, tungsten, chromium, vanadium, copper, silver and gold, at least one of said elements forming a porous oxide carrier of high surface area when the hydrous oxide thereof is dried and calcined.

6. A method of manufacturing multicomponent solid catalyst particles comprising: forming a slurry of gelatinous precipitates of compounds of elements forming the catalyst components, in a strongly ionic aqueous medium; separating from said slurry a mass of said gelatinous precipitates containing occluded ionic aqueous medium; partially drying the separated gelatinous precipitates containing occluded ionic aqueous medium to a water content in the range of 55–83 weight percent; extruding the partially dried gelatinous precipitates through a die forming extrudate shapes containing occluded ionic aqueous medium; washing the extrudate shapes until essentially free of catalyst-contaminating ions present in the occluded ionic aqueous medium; and thereafter drying and calcining the washed extrudate shapes.

7. The method of claim 6 wherein said slurry is formed at a pH of from about 6 to about 8.

8. The method of claim 6, wherein the separated mass of gelatinous precipitates is subdivided into cohesive particles containing more than 85 weight percent water as occluded ionic aqueous medium and then partially dried.

9. The method of claim 8, wherein said cohesive particles, after partially drying, are recombined and resubdivided into new cohesive particles which are further dried to the water content desired in the gelatinous precipitates for extruding to form the extrudate shapes which are to be washed.

10. The method of claim 9 wherein said further drying of resubdivided new cohesive particles adjusts the water content in the gelatinous precipitates extruded to in the range of 65–80 weight percent.

11. A method of manufacturing multicomponent catalyst particles which comprises: forming a slurry of gelatinous precipitates in a strongly ionic aqueous medium at a pH of 6–8, said gelatinous precipitates comprising finely divided hydrous oxides of at least three elements, including an element selected from: (1) the group consisting of elements of Groups IB, VB, VIB, VIIB, and VIII; and an element selected from (2) the group consisting of elements of Groups IIA, IIIA, IVA, IVB, and VA, and (3) at least one other element selected from one of said groups (1) and (2), at least one of said elements forming a porous oxide carrier of high-surface area when the hydrous oxide thereof is dried and calcined; separating from said slurry a mass of unwashed gelatinous precipitates comprising the above-described hydrous oxides containing occluded ionic aqueous medium; subdividing the mass of unwashed gelatinous precipitates into cohesive particles which comprise more than 83 weight percent water; partially drying the subdivided particles of unwashed gelatinous precipitates in an atmosphere of high relative humidity until the cohesive particles thereof comprise 65–83 weight percent water; recombining the partially dried cohesive particles still containing occluded ionic aqueous medium, and extruding the recombined mass of partially dried unwashed gelatinous precipitates, forming extrudate rods of larger diameter than desired for the final catalyst particles; washing the extrudate rods until essentially free of catalyst-contaminating ions present in the occluded ionic aqueous medium; and drying and calcining the washed extrudate rods, thereby forming directly the desired catalyst particles by shrinkage of the extrudate rods.

12. The method of claim 11, wherein said slurry of gelatinous precipitates is formed by preparing acidic aqueous solutions or sols of compounds of at least said three elements, combining said solutions or sols, and precipitating said gelatinous precipitates to form said slurry by adding slowly an aqueous solution of a base sufficient to adjust the pH in the resulting body of aqueous liquid into the range of 6–8.

13. A process for manufacturing multicomponent catalyst in the form of shaped particles, said catalyst comprising at least three essential components including (1) a porous inorganic oxide carrier or high surface area formed from an element selected from the group consisting of aluminum, silicon, titanium, and zirconium, (2) a specific reaction catalyzer formed from a metal element selected from the group consisting of iron, nickel, cobalt, platinum, palladium, manganese, rhenium, molybdenum, tungsten, chromium, vanadium, copper, silver, and gold, and (3) a promoter or modifier formed from a different element selected from the group consisting of magnesium, aluminum, silicon, tin, titanium, zirconium, phosphorus, arsenic, antimony, iron, cobalt, nickel, platinum, palladium, manganese, rhenium, molybdenum, tungsten, chromium, vanadium, copper, silver, and gold, wherein the improvement comprises:

A. forming aqueous solutions or sols of compounds of at least three elements from which at least the essential components of the desired catalyst can be formed;

B. combining said solutions or sols and precipitating in the resulting body of aqueous liquid a dispersed hydrogel or gelatinous precipitate comprising compounds of at least said elements for forming said essential components;

C. separating from said body of liquid a mass in the form of cohesive pieces of said gelatinous precipitate, each said piece containing an occluded portion of liquid, containing salt-forming anions and cations derived from said solutions or sols;

D. prior to washing said mass to reduce the salt content thereof: (1) partially drying said mass of cohesive pieces to remove a portion of the water present in said occluded liquid and thereby obtain a mass of cohesive pieces with a moisture level between about 50 and 85 weight percent, (2) mechanically working together the partially dried mass of cohesive pieces, and forming the worked mass into new cohesive pieces prior to further reduction in the water content thereof, (3) further drying the mass of new cohesive pieces to remove an additional portion of said water, and (4) mechanically working together and extruding said further dried and worked mass into shaped particles;

E. washing said shaped particles to reduce the salt content thereof; and

F. drying and calcining said washed particles.

14. A catalytic hydroconversion process comprising contacting a hydrocarbon feed in the presence of hydrogen and at hydroconversion conditions of elevated temperature and pressure with macroparticles of catalyst prepared by a process comprising extruding a partially dried salt-containing gelatinous precipitate containing between about 50 and 85 weight percent moisture to form a salt-containing extrudate shape, then washing out salt from the extrudate shape, and then drying and calcining the washed extrudate shape.

15. In a catalytic hydroconversion process comprising passing a hydrocarbonaceous feed and hydrogen through a fixed bed of solid catalyst particles in a reaction zone at hydroconversion conditions of elevated temperature and pressure, and recovering from the reaction zone effluent a hydrocarbon oil lower boiling than said feed, said catalyst containing a hydrogenation-dehydrogenation promoter component formed from an element of Group VIII, a porous inorganic oxide carrier component formed from an element selected from the group consisting of aluminum, silicon, zirconium, and titanium, and at least one other component formed from a different element of Groups IB, IIA, IIIA, IVA, IVB, VA, VB. VIB, VIIB, and VIII; the improvement for obtaining increased hydroconversion activity and stability which comprises employing as said catalyst hard, glassy, extrusion-shaped particles with a ratio of length to diameter of from one to three, said particles exhibiting conchoidal fracture when broken characteristic of a solid xerogel and further resembling a xerogel by the characteristic absence of microscopically evident substructure, having a particle density of at least 1.4 g/cc, a side crushing strength of at least 30 pounds, a surface area above 300 m$^2$/g, and a pore volume of 0.25–0.40 cc/g, and wherein said catalyst particles are prepared by a process comprising extruding a partially dried salt-containing gelatinous precipitate containing between about 50 and 85 weight percent moisture to form a salt-containing extrudate shape, then washing out salt from the extrudate shape, and then drying and calcining the washed extrudate shape.

* * * * *